United States Patent [19]

Holzbaur

[11] 4,197,824
[45] * Apr. 15, 1980

[54] FUEL INJECTION SYSTEM

[75] Inventor: Siegfried Holzbaur, Stuttgart, Fed. Rep. of Germany

[73] Assignee: Robert Bosch GmbH, Stuttgart, Fed. Rep. of Germany

[*] Notice: The portion of the term of this patent subsequent to Mar. 21, 1995, has been disclaimed.

[21] Appl. No.: 884,315

[22] Filed: Mar. 7, 1978

Related U.S. Application Data

[63] Continuation of Ser. No. 562,859, Mar. 27, 1975, Pat. No. 4,079,718.

[30] Foreign Application Priority Data

Mar. 29, 1974 [DE] Fed. Rep. of Germany ....... 2415182

[51] Int. Cl.² ............................................. F02M 39/00
[52] U.S. Cl. .......................... 123/139 AW; 137/527.8; 261/44 A; 251/305
[58] Field of Search ............ 123/139 AW; 137/527.8, 137/499; 251/305; 261/44 R, 44 A

[56] References Cited

U.S. PATENT DOCUMENTS

| | | | |
|---|---|---|---|
| 1,477,280 | 12/1923 | Pordes | 261/44 A |
| 1,493,894 | 5/1924 | Reece | 261/44 A |
| 1,534,212 | 4/1925 | Hess | 261/44 A |
| 1,746,681 | 2/1930 | Richardson | 261/44 A |
| 1,839,102 | 12/1931 | Kessel | 261/44 A |
| 2,617,638 | 11/1952 | Udale | 261/44 A |
| 2,755,818 | 7/1956 | Dietz | 261/44 A |
| 3,144,045 | 8/1964 | Fitzpatrick | 137/527.8 |
| 3,352,318 | 11/1967 | Yanowitz | 137/527.8 |
| 3,926,215 | 12/1975 | Macleod | 137/527.8 |
| 4,079,718 | 3/1978 | Holzbaur | 123/139 AW |

FOREIGN PATENT DOCUMENTS 611784 10/1926 France .................................. 261/44 A Primary Examiner—Ronald H. Lazarus
Assistant Examiner—M. Moy
Attorney, Agent, or Firm—Edwin E. Greigg

[57] ABSTRACT

In a fuel injection system, the combination of an air measuring valve, biasing structure and an air suction tube of an internal combustion engine. The suction tube defines an air flow cross section and the air measuring valve provides a controlled flow of air through the flow cross section, with the air measuring valve being mounted eccentrically within the suction tube against a force produced by the biasing structure to effect the noted control. Both the air measuring valve and the suction tube have cooperating surfaces which effect a closing of the flow cross section by the biasing structure when no air is flowing; and during air flow a gradual opening at one end of the air measuring valve by an impedance induced force as a function of the pressure difference prevailing on both sides of the air measuring valve and a further opening at the other end of air measuring valve as the air flow increases through the opening at the first mentioned end.

8 Claims, 6 Drawing Figures

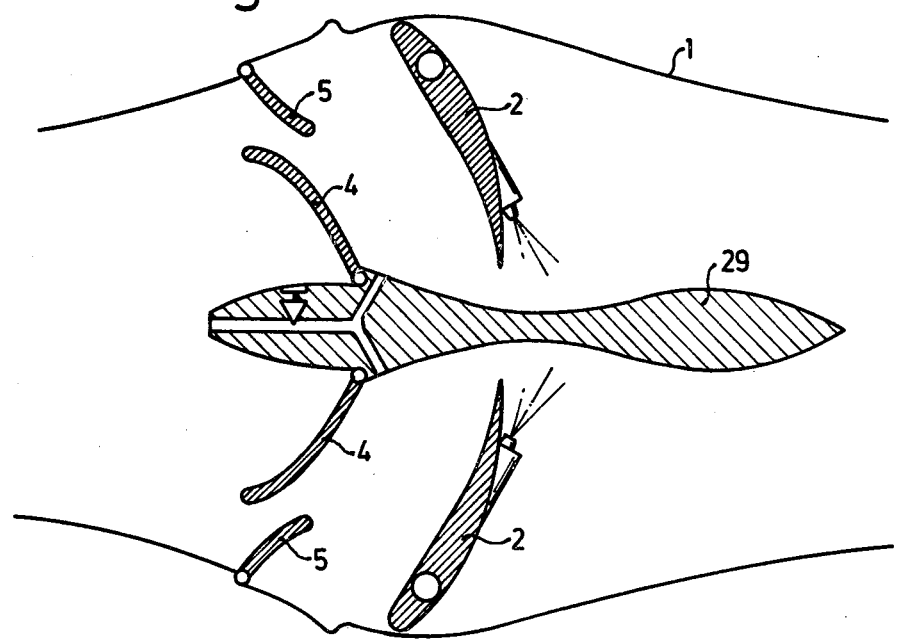
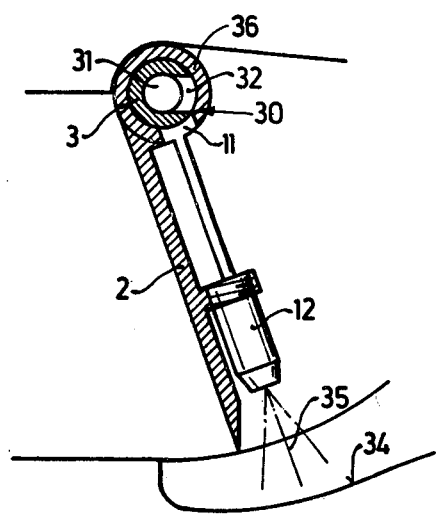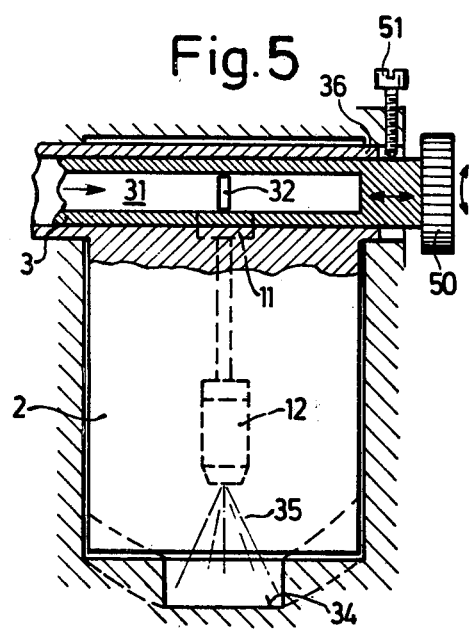

FUEL INJECTION SYSTEM

CROSS REFERENCE TO RELATED APPLICATION

This application is a continuation of application Ser. No. 562,859, filed Mar. 27, 1975, now U.S. Pat. No. 4,079,718.

BACKGROUND OF THE INVENTION

The present invention relates to a fuel injection system for externally ignited internal combustion engines. The system comprises an air sensing or measuring device comprising a valve which is exposed to the air stream in the suction tube of the engine. The rotation of this valve by the air against a restoring force constitutes a gauge for the amount of air flowing through the suction tube.

An air measuring device of this type is designed to measure as accurately as possible the amount of air flowing through the suction tube in order to meter a corresponding quantity of fuel to the quantity of air. To enable simple air measuring means to be used and to enable the quantity of air and fuel to be proportioned through influencing the fuel injection system while avoiding the need to make subsequent major adjustments, the relationships should be linear, for example, by maintaining two opposed non-linear but similar functions.

In the case of a known air measuring device of the above type, a baffle plate, which is vertically exposed to the air stream, is pushed according to the impedance type flow valve principle (hereinafter impedance principle) by an impedance induced force against a constant restoring force such that there is a linear relationship between the displacement path and the air flowing through the suction tube. Although the constant charging deficiency caused by the impedance is not disadvantageous in the case of small quantities of air, i.e. small air flow, at full load the charging deficiency in the engine cylinders is undesirable.

In the case of another known air measuring device operating according to the impedance principle the air measuring valve is disposed on one side and is swivelled about a pivot axis according to the quantity of air flowing through the suction tube. As a result of the changed angle of attack on the leading face of the air measuring device in the air flow direction and the associated variation in the differential pressure, the positioning force on the air measuring device decreases as the opening angle increases. This has the advantage that at full load reduced charging deficiencies occur. However, it has the disadvantage that at full load measuring becomes relatively inaccurate and the restoring force is not constant, with the resulting disadvantages of influencing the fuel injection system with non-linear proportioning of the air quantity and fuel quantity.

In the case of another known air measuring device, the valve is eccentrically mounted such that a smaller part of the valve projects into the portion of the suction tube in front of the mounting and the other part of the valve projects behind the mounting. With this air measuring device, the impedance, that is, the difference in the pressure in front of and behind the valve, is initially effective, i.e. when the valve is closed, to move the valve in its opening direction and subsequently and in accordance with the airfoil principle, the lift acting on the valve is also effective. Essentially only the differential surface between the larger and smaller surface parts of the valve acts as the resulting effective surface of the valve. The force engaging this effective surface is derived from the effective surface area times the associated air index (times ram pressure) acting on this effective surface. This force acts either as a force directed at right angles to the flow direction, or as an impedance induced force acting in the flow direction. This force forms with respect to the axis of rotation of the valve, the torque (adjusting moment) acting on the valve. With a sudden transition, in the case of this known air measuring device from the impedance principle to the combined impedance - airfoil principle, virtually undeterminable functions occur between the air quantity and the regulating distance of the valve and to ensure reliable fuel metering these must be corrected, either in the fuel metering device per se or by adjusting the restoring force acting on the valve.

OBJECT AND SUMMARY OF THE INVENTION

The principal object of the present invention is to provide a fuel injection system of the above-described type in which the air measuring device produces the least possible charging deficiencies at full load and in which the torque, possibly the resultant torque acting on the valve is either linear over the entire speed and load range of the engine or it may be easily balanced by appropriate restoring forces so that preferably a constant air velocity with a constant ram pressure always prevails in the section of the suction tube uncovered by the valve for constant air density.

This object and others are accomplished according to the present invention in that with small quantities of air, i.e. small air flow, the air measuring valve is deflected in accordance with the impedance principle, as a function of the pressure prevailing in front of and behind the air measuring valve. With larger quantities of air, i.e. large air flow, there is a gradual transition of the air measuring valve to a point where the air measuring valve operates with at least a partial surface according to the airfoil principle, whereby the corresponding surface has air circulating on both sides thereof and receives a thrust or lift as a function of the air quantity flowing past and hence a resultant moment due to the air forces is developed with respect to the pivot axis of the air measuring valve. As will be made apparent hereinafter, only a gradual transition enables a linear torque or moment to be obtained or enables the transition to be balanced with the restoring force by simple means. According to a corresponding feature of the invention, the smaller section of the valve relative to the axis (leading wing edge), which is pivotable in the part of the suction tube disposed in the flow direction in front of the axis, blocks the region it controls and then, as the quantity of air or air flow increases, it gradually uncovers this region until, at full load and maximum speed, it is completely open.

According to another feature of the present invention, a bore for supplying fuel is disposed in the pin measuring of the air measuring valve. The bore communicates with at least one channel provided in the air measuring valve. This channel terminates in at least one nozzle which is preferably disposed at the end of the air measuring valve. By virtue of this arrangement, on the one hand, the fuel is injected into the air stream in the highest speed region, thus providing for good mixing and, on the other hand, fuel metering can be effected with simple means and short lines by the air measuring device itself.

Other objects, features and advantages of the present invention will be made apparent in the following detailed description of the various embodiments thereof which is provided with reference to the accompanying drawings.

BRIEF DESCRIPTION OF THE DRAWINGS

FIG. 3 illustrates two parallel air metering valves according to the first embodiment of the present invention;

FIGS. 4 and 5 illustrate details of the fuel metering system according to the present invention.

DESCRIPTION OF THE PREFERRED EMBODIMENTS

Figure 1:
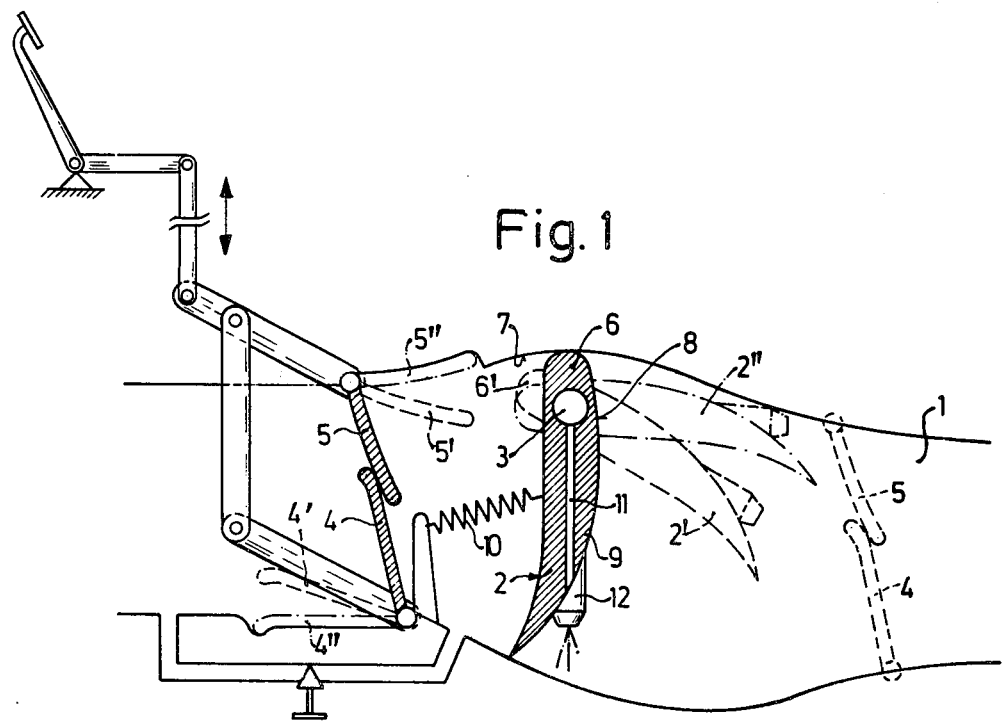
FIGS. 1 and 2 illustrate a first embodiment of the present invention comprising a monopart air metering valve and a two part throttle valve.

In FIG. 1 there is illustrated an air measuring valve 2 eccentrically mounted for rotation in a suction tube 1 by a pin 3. A two-part throttle valve 4, 5 is disposed in the suction tube 1 in the flow direction of the air in front of the air measuring valve 2. Part 5 of the throttle valve 4, 5 is pivotable in the direction of the air flow with respect to part 4 of the throttle valve. To equalize the forces, the two valve parts are coupled together so as to be oppositely rotatable. The structure for accomplishing this purpose is conventional as shown. In this way the excess force tending to displace one valve part against the air flow is compensated by the lesser force of the other valve part which is displaced with the air flow. Thus, in principle, equalization of the forces is effected in the same manner as with a butterfly throttle valve. The metering valve 2 can be viewed as having a leading portion 6 and a larger portion 9.

The disposition of the two-part throttle valve 4, 5 according to the present invention has considerable technical advantages in terms of flow. To illustrate this point, in FIG. 1 various positions of the air measuring valve 2 and the throttle valve 4, 5 are represented by the dashed lines. The corresponding reference numbers are appropriately identified with a single and double prime notation. The positions 2', 4', 5' relate to a first pivoting region and correspond to an average speed at partial load (part throttle). In the partial load position the leading portion 6' has been displaced from the suction tube wall 7 which it nearly engages during its idling and low speed positions. As a result, a part of the air flowing through the suction tube 1 can also flow along the rear surface 8 of the air flow measuring valve 2. The throttle valve part 5, which pivots in the direction of flow, impedes the flow around the rear surface 8 of the air flow measuring valve when the opening cross-sections of the throttle valve are small. However, as the cross-section of the passage increases, this rear surface flow increases. Conversely, by virtue of the throttle valve part 4, even with small air flows the larger pivot portion 9 of the air measuring valve 2 can be acted on by the air to achieve a corresponding, accurate rotation of the air valve even with a small flow of air. A restoring force for the air measuring valve 2 is produced by a spring 10 which acts directly on the air measuring valve 2. A hydraulic or alternative force can also be used for the restoring force.

With the air measuring valve 2 closed and with reduced air flows, the air measuring valve is displaced according to the impedance principle. With increased air flows, displacement is effected according to the airfoil principle. According to the impedance principle the valve is displaced by the pressure prevailing in front of and behind the air measuring valve, and according to the airfoil principle displacement of the air measuring valve depends on the lift forces of the air acting on the valve. With a constant lift, when the valve is opened, the predominant adjusting force gradually changes from an impedance force to a lift force, since the impedance force decreases as the valve is opened but the lift increases. Linearity of operation can be achieved if the ratio between the pivot angle or angle of rotation of the air measuring valve 2 and the cross-section which is left free by the same is constant, i.e., if a constant air velocity prevails in the cross-section. Further details of the transition of the forces will be provided in relation to the description of the diagram in FIG. 6.

The fuel is supplied via the pin 3 and a channel 11 which is formed in the larger pivot portion 9 of the air measuring valve 2. The fuel is injected by means of one or more injection nozzles 12.

Figure 2:
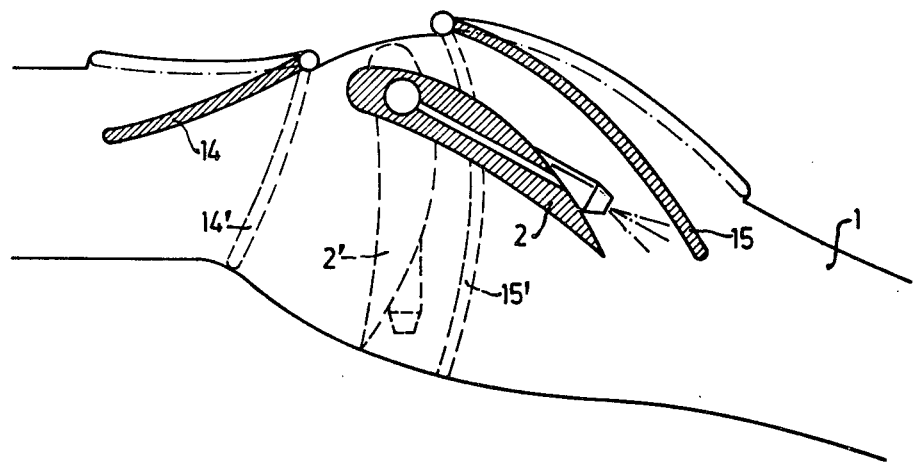

In the embodiment illustrated in FIG. 2, a part 14 of the throttle valve 14, 15 is disposed in front of the air measuring valve 2 in the air flow direction and the other part 15 is disposed behind the air measuring valve 2. Displacement of the parts 14 and 15 can be achieved by a structure similar to that used for parts 4 and 5. As is apparent from the position of the throttle valve parts 14', 15' represented by the dashed lines, these virtually cover the entire suction tube cross-section at the control location in the closed state. In the open state which is represented, a very favorable flow is also produced on the rear surface of the air measuring valve 2, in particular, because of the valve part 15. This is due to the fact that the air stream cross-section between the valve part 15 and the air measuring valve 2 is constant over virtually the entire length of the air measuring valve. As in the case of the embodiment illustrated in FIG. 1 and in all other embodiments the suction tube 1 preferably has a rectangular cross-section in the region of the valve control means, to enable the relationship between the angle of rotation and the cross-section which is left free, to be controlled more easily.

In the case of large engines, it may be advantageous to arrange two air measuring valves operating with fuel injection in parallel, as indicated in FIG. 3. In this case, the central part 29 is rigidly connected to the suction tube 1. A double valve arrangement of this type may be advantageous for stratified charge engines.

FIGS. 4 and 5 illustrate how the fuel is supplied through the pin 3 and is metered at the point 30 prior to being injected via the nozzle 12. The fuel flows in the direction of the arrow through the longitudinal bore 31 of pin 3. A slot 32 is disposed at right angles to the longitudinal axis and cooperates with the channel 11 of the air measuring valve 2. As is shown in FIG. 5, which shows a sectional view of the pin 3 and a bushing 36 passing straight through the slot 32, during rotation the channel 11 is increasingly opened, such that after a rotation of approximately 90°, the channel 11 or the entire slot 32 is opened. Thus, when the fuel is supplied to the metering point 11, 32, (fuel valve) under a constant pressure difference, the quantity of fuel which is metered corresponds to the particular angular position of the air measuring valve 2. The metering operation can also be effected in the most varied alternative ways, for example, in place of a slot 32, a bore which cooperates with the bore 11 can be provided, or in place of a slot an opening having a conical or alternative form can be provided.

The fuel is advantageously injected into a chamber 34. The width of this chamber increases in the flow direction and corresponds to the diameter of the injection cone 35 in the region of the chamber. The air is supplied via the valve in the lower speed range into the chamber 34 to obtain good fuel preparation.

Figure 6:
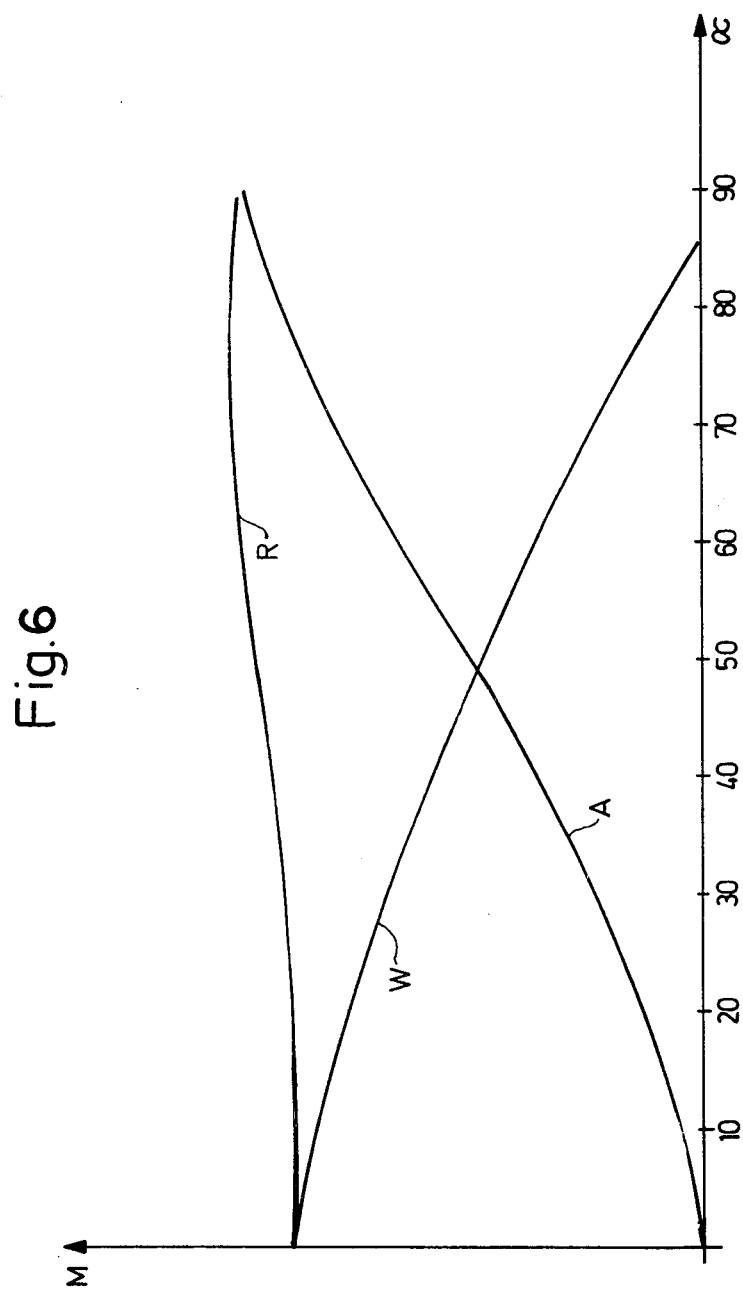
FIG. 6 is a diagram illustrating the variation of the moment acting on the air metering valve.

The operation of the air measuring valve will be described in further detail with reference to the diagram illustrated in FIG. 6. The moment M acting on the air measuring valve is represented by the ordinate and the angle of rotation of the air measuring valve by the abscissa. The curve W represents the variation of the moment over the angle of rotation which is caused to act on the air measuring valve by the flow impedance (pressure difference) and the curve A represents the variation of the moment produced by the lift force acting on the air measuring valve. The moment is formed in each case by the force of the air and the lever arm which is formed between the resultant center of pressure on the air measuring valve and the axis of rotation of the valve. When there is a flow impedance, the moment decreases as the opening angle increases because the impedance factor decreases and thus the pressure difference between the air pressure in front of and behind the air measuring valve also decreases. In contrast therewith, the lift moment increases since the effective surface remains constant, that is, the entire leading wing surface, but the lever arm, namely the distance projected at right angles to the axis between the axis and the point of application of the lift force, decreases as the valve opens. This opposition of the applied moments produces a resultant curve R, the variation of which can be influenced. Depending on the form of the air measuring valve, the auxiliary valve, the bracket with its kinematics and the suction tube with respect to the open cross-section, the variation of this resultant curve and thus the fuel-air ratio of the mixture may be predetermined. In any event, the subject of the present invention ensures that at full load the charging deficiencies are kept to a minimum as, in this speed range, the air measuring valve is not adjusted according to the impedance principle but according to the airfoil principle which operates with substantially lower flow losses.

As shown in FIG. 5 the pin 3 can be displaced axially and rotatably against bushing 36 by means of a button 50. In order to lock the adjusted position a screw 51 is provided. These provisions allow fuel-flow-corrections and in turn accurate adjustment of the fuel-air ratio.

What is claimed is:

1. In the combination comprising: an air suction tube of an internal combustion engine; an air measuring valve; mounting means for mounting the air measuring valve in the air suction tube; and biasing means, the suction tube defining an air flow cross section and the air measuring valve providing a controlled flow of air through the flow section, the improvement wherein:
the air measuring valve is mounted eccentrically by said mounting means within the air suction tube for pivotal displacement by the air flow drawn into the suction tube by the engine against the force exerted on the air measuring valve by the biasing means; and
one end of the air measuring valve and the suction tube have curved cooperating surfaces relatively dimensioned so that the flow cross section in the region of the air measuring valve is closed by the air measuring valve under the force of the biasing means during periods when the air flow ceases, is gradually opened at the other end of the air measuring valve by an impedance induced force as a function of the pressure difference prevailing on both sides of the air measuring valve, and is further opened at said one end of the air measuring valve as the air flow increases through the opening at said other end.

2. The combination as defined in claim 1, wherein the air measuring valve has a short portion and a long portion due to its eccentric mounting, wherein the long portion extends toward the opening at said other end and is pivoted in the direction of air flow, and the short portion extends toward the opening at said one end and is pivoted against the direction of air flow.

3. The combination as defined in claim 1, further comprising a fuel injection nozzle, wherein the mounting means for pivotably mounting the air measuring valve includes a bushing with a bore in which a pin is disposed representing a fuel valve, said fuel valve including a further bore and at least one opening through which fuel is supplied to at least one channel, wherein said air measuring valve includes said at least one channel which communicates with said further bore through said opening, and wherein the nozzle is disposed at said other end of the air measuring valve and communicates with the channel for discharging fuel into the suction tube.

4. The combination as defined in claim 3, wherein said at least one opening is a radial opening which cooperates with said channel for metering fuel through said channel in accordance with the angular position of the air measuring valve.

5. The fuel injection system as defined in claim 3, wherein the pin is rotatably displaceable for accurate adjustment of the fuel-air ratio.

6. The fuel injection system as defined in claim 3, wherein the pin is axially displaceable for accurate adjustment of the fuel-air ratio.

7. The fuel injection system as defined in claim 3, wherein the pin is rotatably and axially displaceable for accurate adjustment of the fuel-air ratio.

8. In the combination comprising: an air suction tube of an internal combustion engine; a fuel injection nozzle; an air measuring valve; mounting means for mounting the air measuring valve in the air suction tube; and biasing means, the suction tube defining an air flow cross section and the air measuring valve providing a controlled flow of air through the flow cross section, the improvement wherein:
the air measuring valve is mounted eccentrically by said mounting means within the air suction tube for pivotal displacement by the air flow drawn into the suction tube by the engine against the force exerted on the air measuring valve by the biasing means;
the mounting means for pivotably mounting the air measuring valve includes a bushing with a bore in which a pin is disposed representing a fuel valve, said fuel valve including a further bore and at least one opening through which fuel is supplied to at least one channel;

the air measuring valve includes said at least one channel which communicates with said further bore through said opening;

the nozzle is disposed at the end of the air measuring valve and communicates with the channel for discharging fuel into the suction tube;

the suction tube includes a fuel injection chamber defined by a wall portion thereof;

fuel is injected into said chamber by the fuel injection nozzle;

air is guided into said chamber by the air measuring valve, in particular when there are small opening cross-sections in the suction tube;

the width of said chamber corresponds approximately to the diameter of the cone formed by the injected fuel at the region of said chamber; and the air measuring valve and the suction tube have their cooperating surfaces relatively dimensioned so that the flow cross section in the region of the air measuring valve is closed by the air measuring valve under the force of the biasing means during periods when the air flow ceases, is gradually opened at one end of the air measuring valve by an impedance induced force as a function of the pressure difference prevailing on both sides of the air measuring valve, and is further opened at the other end of the air measuring valve as the air flow increases through the opening at said one end.

* * * * *